United States Patent Office 3,234,244
Patented Feb. 8, 1966

3,234,244
PROCESS FOR THE EPIMERIZATION OF 11-KETO-5α,9α,10α-STEROIDS TO THE CORRESPONDING 11-KETO-5α,9β,10α-STEROIDS
Alexander D. Cross, Mexico City, Mexico, assignor to Syntex Corporation, Panama, Panama, a corporation of Panama
No Drawing. Filed Jan. 10, 1963, Ser. No. 250,479
Claims priority, application Mexico, Oct. 11, 1962, 69,297
15 Claims. (Cl. 260—397.45)

The present invention relates to a novel method for the production of cyclopentanophenanthrene derivatives.

More particularly the present invention relates to a novel process for the production of 5α,9β,10α-steroids, especially those belonging to the estrane (19-nor-androstane) and 19-nor pregnane series.

The 5α,9β,10α-configuration has a striking effect on the physiological properties of steroids. For example, in the estrane series, 5α,9β,10α-estrane-3,11,17-triol is a very active anabolic agent and is a sedative of the central nervous system; 19-nor-5α,9β,10α-pregnan-17α-ol-3,11,-20-trione and similar compounds, are powerful progestational agents, with good oral activity and very useful in control of fertility; likewise, they reduce the cholesterol level in the blood.

In addition to the aforementioned properties, the 5α,9β,-10α-steroids, object of the present invention, are intermediate compounds in the production of retro-steroids (9β,10α) of importance known to those skilled in the art. Starting with the compounds of the present invention there may be prepared, for example, 19-nor-9β,10α-progesterone, 19-nor-9β,10α-testosterone and similar compounds, by conventional methods.

In accordance with the present invention the surprising discovery has been made that the 11-keto-5α,10α-steroids, obtained by catalytic hydrogenation of $\Delta^{1,3,5(10)}$, $\Delta^{2,5(10)}$ or $\Delta^{5(10)}$-steroids, having a hydroxyl or keto group at C–11 followed by conventional oxidation in order to transform the oxygen bearing groups at C–11 into keto groups, by treatment in an alkaline medium, produce the corresponding 11-keto-5α,9β,10α-steroids, which may be treated by conventional means to give the respective 11-desoxy derivatives, the respective 11α or 11β-hydroxyl derivatives or similar compounds.

The novel process of the present invention is represented by the following scheme:

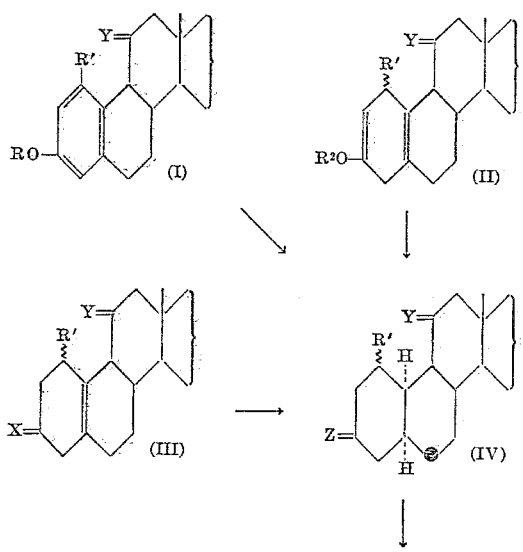

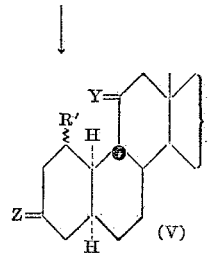

In the above formulae wherein only the rings, A, B, and C of the steroid nucleus are represented, R represents hydrogen or a lower alkyl group; $R^1$ represents hydrogen or a lower alkyl group; $R^2$ represents a lower alkyl group; X and Y, each represents a hydroxyl group in position α or β or a keto group; Z represents a hydroxyl group, a lower alkoxy group or a keto group and the ⌇ indicates that the substituent attached thereby to the steriod nucleus may be in positions α or β.

The starting compounds of the process outlined above (I, II, III) belong preferably to the estrane (19-norandrostane) and 19-nor-pregnane series and are $\Delta^{1,3,5(10)}$-triene, $\Delta^{2,5(10)}$-diene or $\Delta^{5(10)}$-ene derivatives with a hydroxyl or keto group at C–11 and preferably with a keto group, a lower alkoxy or hydroxy at C–3. In the steroid molecule, there may be present several substituents without interfering with the normal course of the reaction of the present process. For example, lower alkyl groups may be present in positions C–1, C–2, C–4, C–6, C–12, C–15, C–16 and/or C–17; hydroxyl groups or keto group may be present in positions C–6, C–7, C–12, C–15, C–16 and/or C–17. There may also be present in the molecule, derivatives of the foregoing functional groups which are usual in steroid chemistry and are known to those skilled in the art, such as acyloxy, alkoxy, formyl groups, and the like.

By proceeding in accordance with the above scheme, a starting compound of the type mentioned hereinbefore (I, II, or III) is hydrogenated under a pressure of approximately 1 to 120 atmospheres, at a temperature between approximately 80° and 170° C. during a period of time of the order of 5 to 30 hours, in an organic solvent, preferably polar, such as a lower hydrocarbon alcohol, for example ethanol, or a lower alkyl ester of a hydrocarbon carboxylic acid of up to 8 carbon atoms, such as for example, ethyl acetate, in the presence of a heavy metal catalyst, preferably pertaining to the group of transitional elements of the Periodic Table, such as platinum, ruthenium, palladium or nickel, and optionally in the presence of an acid, if there is no 3-alkoxy-$\Delta^{2,5(10)}$-grouping present, preferably mineral, such as hydrochloric acid, or of a base, if there is no 3-keto-$\Delta^{5(10)}$-moiety present, preferably a hydroxide or a lower alkoxide of an alkali metal, such as sodium hydroxide or sodium methoxide, thus giving the corresponding 11-hydroxy-5α,10α-steroid (IV:Y=hydroxy). The 11-hydroxy group of the latter steroid, which may have its origin in the hydroxyl group existing in the starting compound or in the reduction of a keto group in the course of the catalytic hydrogenation, is oxidized by conventional methods, for example using chromium trioxide in acid solutions or pyridine solutions, thus furnishing the corresponding 11-keto derivatives (IV:Y=keto). These 11-keto-5α,10α-steroids are treated with a base, preferably an alkali metal hydroxide or lower alkoxide, such as sodium hydroxide or sodium methoxide, in an organic solvent preferably polar, such as a lower hydrocarbon alcohol, e.g. methanol, during approximately 1 to 24 hours and at a temperature between room and steam bath temperatures, thus affording the corresponding 11-keto-5α,9β,10α-steroids (V).

The 11-keto-5α,9β,10α-steroids, obtained by the above described procedure may undergo a series of conventional transformations, such as the reduction of the keto group to hydroxy group, or the total elimination thereof, e.g. by treatment according to the Wolff-Kishner reaction, without losing the 5α,9β,10α-configuration.

The isolation of the reaction products of the present process has no critical importance and may be effected according to conventional methods, it being also possible for the products of a reaction in the form of a solution to be treated by the subsequent reaction method, thus undergoing the same transformations as if it were isolated and in solid form.

Examples of compounds which may be prepared by the process of the present invention are:

3-methoxy-1β-methyl-5α,9β,10α-estrane-11,17-dione.
3β-methoxy-19-nor-5α,9β,10α-pregnane-11,20-dione.
3β-methoxy-19-nor-5α,9β,10α-pregnan-17α-ol-11,20-dione.
3β-methoxy-1β-methyl-19-nor-5α,9β,10α-pregnane-11,20-dione.
3β-methoxy-1α-methyl-5α,9β,10α-estrane-11,17-dione.
3β-methoxy-1α-methyl-19-nor-5α,9β,10α-pregnane-11,20-dione.
5α,9β,10α-estrane-3,11,17-trione.
1α-methyl-5α,9β,10α-estrane-3,11,17-trione.
19-nor-5α,9β,10α-pregnane-3,11,20-trione.
19-nor-5α,9β,10α-pregnan-17α-ol-3,11,20-trione.
1α-methyl-19-nor-5α,9β,10α-pregnane-3,11,20-trione.
1β-methyl-5α,9β,10α-estrane-3,11,17-trione.
1β-methyl-19-nor-5α,9β,10α-pregnane-3,11,20-trione.

The following specific examples serve to illustrate but are not intended to limit the scope of the present invention:

PREPARATION 1

To a suspension of 25 g. of estrone cycloethyleneketal in 25 cc. of acetone there was added a solution of 70 g. of potassium hydroxide in 37.5 cc. of water and the stirred mixture was treated dropwise with 40 cc. of methyl sulfate. The reaction mixture was then stirred for 45 minutes further, poured into dilute hydrochloric acid solution and the formed precipitate collected by filtration. Crystallization from chloroform-methanol gave the 3-methyl-ether 17-cycloethyleneketal of estrone.

A solution of 10 g. of the 3-methyl ether 17-cycloethyleneketal of estrone in 200 cc. of anhydrous dioxane was refluxed during 24 hours with 1.1 molar equivalents of 2,3-dichloro-5,6-dicyano-1,4-benzoquinone. It was then cooled, the hydroquinone formed during reaction was separated by filtration and the filtrate was diluted with 1 liter of ethyl acetate. The resulting solution was washed with 1 liter of a 1% aqueous solution of sodium hydroxide, with water to neutral, dried over anhydrous sodium sulfate and evaporated to dryness under reduced pressure.

The crystalline residue was dissolved in 200 cc. of acetone and the resulting solution was passed through a column of 400 g. of alumina. The less polar crystalline fractions were combined and recrystallized from methylene chlorine hexane to give the 3-methyl ether 17-cycloethyleneketal of the $\Delta^{9(11)}$-dehydro-estrone.

Through a solution of 10 g. of the 3-methyl ether 17-cycloethyleneketal of $\Delta^{9(11)}$-dehydro-estrone in 300 cc. of anhydrous tetrahydrofurane, was passed a current of diborane during 3 hours and the reaction mixture was kept at room temperature overnight under anhydrous conditions. The excess of diborane was decomposed with water, the solution extracted with methylene chloride and the organic extract washed with water to neutral, dried over sodium sulfate and evaporated to dryness. The oily residue was dissolved in 45 cc. of acetone and 225 cc. of ethanol, was cooled to −5° C. and there were added, dropwise, 650 mg. of sodium hydroxide dissolved in 6 cc. of water and 90 cc. of 35% hydrogen peroxide. The mixture was stirred during 1 hour, neutralized with acetic acid and extracted with methylene chloride. The organic extract was washed with water, dried over anhydrous sodium sulfate and evaporated to dryness. The residue was chromatographed on 400 g. of washed alumina. By crystallization of the solid fractions there was obtained the 3-methyl ether 17-cycloethyleneketal of 11α-hydroxy-estrone. The latter compound was treated with 1 cc. of concentrated hydrochloric acid in 250 cc. of acetone overnight at room temperature. Conventional isolation yielded the 3-methyl ether of 11α-hydroxy-estrone.

PREPARATION 2

Estradiol was treated according to the techniques described in Preparation 1, producing successively the 3-methyl ether of estradiol, the 3-methyl ether of $\Delta^{9(11)}$-dehydro-estradiol and the 3-methyl ether of 11α-hydroxy-estradiol.

PREPARATION 3

1-methyl-estrone was conventionally converted into the corresponding cycloethyleneketal and then was treated following the techniques described in Preparation 1, giving successively the 3-methyl-ether-17-cycloethyleneketal of 1-methyl estrone, the 3-methyl-ether-17-cycloethyleneketal of 1-methyl-$\Delta^{9(11)}$-dehydro-estrone, the 3-methyl-ether-17-cycloethyleneketal of 1-methyl-11α-hydroxy-estrone, and the 3-methyl-ether of 1-methyl-11α-hydroxy-estrone.

PREPARATION 4

1-methyl-estradiol was treated in accordance to Preparation 1, thus being obtained successively the 3-methyl-ether of 1-methyl estradiol, the 3-methyl-ether of 1-methyl-$\Delta^{9(11)}$-dehydro-estradiol and the 3-methyl-ether of 1-methyl-11α-hydroxy-estradiol.

PREPARATION 5

19-nor-$\Delta^{1,3,5(10)}$-pregnatrien-3-ol-20-one was treated following the techniques described in Preparation 1, giving successively 3-methoxy-19-nor-$\Delta^{1,3,5(10)}$-pregnatrien-20-one, 3-methoxy-19-nor-$\Delta^{1,3,5(10),9(11)}$-pregnatetraen-20-one and 3-methoxy-19-nor-$\Delta^{1,3,5(10)}$-pregnatriene-11α,20β-diol.

PREPARATION 6

19-nor-$\Delta^{1,3,5(10)}$-pregnatrien-3,17α-diol-20-one was treated in accordance with Preparation 1, thus producing successively 3-methoxy-19-nor-$\Delta^{1,3,5(10)}$-pregnatrien-17α-ol-20-one, 3-methoxy-19-nor-$\Delta^{1,3,5(10),9(11)}$-pregnatetraen-17α-ol-20-one, and 3-methoxy-19-nor-$\Delta^{1,3,5(10)}$-pregnatrien-11α,17α,20β-triol.

PREPARATION 7

1-methyl-19-nor-$\Delta^{1,3,5(10)}$-pregnatrien-3-ol-20-one was treated following the methods described in Preparation 1 to give successively 3-methoxy-1-methyl-19-nor-$\Delta^{1,3,5(10)}$-pregnatrien-20-one, 3-methoxy-1-methyl-19-nor-$\Delta^{1,3,5(10),9(11)}$-pregnatetraen-20-one and 3-methoxy-1-methyl-19-nor-$\Delta^{1,3,5(10)}$-pregnatriene-11α,20β-diol.

PREPARATION 8

A cold solution of 6 g. of 3-methyl ether of 11α-hydroxy-estrone in 750 cc. of anhydrous ether was added to 900 cc. of liquid ammonia followed by 7.8 g. of lithium in small pieces over a period of 10 minutes with constant stirring. The mixture was stirred during 20 minutes more, then there were cautiously added 100 cc. of absolute ethanol and the ammonia was evaporated. Water was added to the residue, the ether distilled off and 3-methoxy-$\Delta^{2,5(10)}$-estradiene-11α,17β-diol was obtained.

Following the same procedure the compounds set forth under A were converted into the respective products listed under B.

| A | B |
|---|---|
| 3-methyl-ether of 1-methyl-11α-hydroxy-estrone. | 3-methoxy-1α-methyl-Δ$^{2,5(10)}$-estradiene-11α,17β-diol. |
| 3-methoxy-19-nor-Δ$^{1,3,5(10)}$-pregnatrien-11α-ol-20-one. | 3-methoxy-19-nor-Δ$^{2,5(10)}$-pregnadiene-11α,20β-diol. |
| 3-methoxy-19-nor-Δ$^{1,3,5(10)}$-pregnatriene-11α,17α-diol-20-one. | 3-methoxy-19-nor-Δ$^{2,5(10)}$-pregnadiene-11α,17α,20β-triol. |
| 3-methoxy-1-methyl-19-nor-Δ$^{1,3,5(10)}$-pregnatrien-11α-ol-20-one. | 3-methoxy-1α-methyl-19-nor-Δ$^{2,5(10)}$-pregnadien-11α-20β-diol. |

PREPARATION 9

A solution of 3.5 g. of 3-methoxy-Δ$^{2,5(10)}$-estradiene-11α,17β-diol in 300 cc. of methanol and 60 cc. of water was treated with 3 g. of oxalic acid at approximately 5° C., with stirring during 40 minutes. The reaction product was extracted with ether, the extract was washed with an aqueous solution of sodium bicarbonate and then with water to neutral, dried over anhydrous sodium sulfate and evaporated to dryness. The residue was crystallized from ethyl acetate, thus being obtained Δ$^{5(10)}$-estrene-11α,17β-diol-3-one.

Following exactly the same method, the rest of the final compounds of Preparation 8, were converted respectively into:

1α-methyl-Δ$^{5(10)}$-estrene-11α,17β-diol-3-one.
19-nor-Δ$^{5(10)}$-pregnene-11α,20β-diol-3-one.
19-nor-Δ$^{5(10)}$-pregnene-11α,17α,20β-diol-3-one.
1α-methyl-19-nor-Δ$^{5(10)}$-pregnen-11α,20β-diol-3-one.

PREPARATION 10

A solution of 10 g. of estrone cycloethyleneketal in 200 cc. of anhydrous dioxane was refluxed during 24 hours with 1.1 molar equivalents of 2,3-dichloro-5,6-dicyano-1,4-benzoquinone. It was then cooled, the hydroquinone formed during reaction was separated by filtration and the filtrate was diluted with 1 liter of ethyl acetate. The resulting solution was washed with 1 liter of a 1% aqueous solution of sodium hydroxide, with water to neutral dried over anhydrous sodium sulfate and evaporated to dryness under reduced pressure.

The crystalline residue was dissolved in 200 cc. of acetone and the resulting solution was passed through a column of 400 g. of alumina. The less polar crystalline fractions were combined and recrystallized from methylene chlorine-hexane to give the Δ$^{9(11)}$-dehydro estrone-cycloethyleneketal.

Through a solution of 10 g. of the latter Δ$^{9(11)}$-dehydroestrone ketal in 300 cc. of anhydrous tetrahydrofurane, was passed a current of diborane during 3 hours and the reaction mixture was kept at room temperature overnight under anhydrous conditions. The excess of diborane was decomposed with water, the solution extracted with methylene chloride and the organic extract washed with water to neutral, dried over sodium sulfate and evaporated to dryness. The oily residue was dissolved in 45 cc. of acetone and 225 cc. of ethanol, was cooled to −5° C. and there were added, dropwise, 650 mg. of sodium hydroxide dissolved in 6 cc. of water and 90 cc. of 35% hydrogen peroxide. The mixture was stirred during 1 hour, neutralized with acetic acid and extracted with methylene chloride. The organic extract was washed with water, dried over anhydrous sodium sulfate and evaporated to dryness. The residue was chromatographed on 400 g. of washed alumina. By crystallization of the solid fractions there was obtained 11α-hydroxy-estrone cycloethyleneketal.

The latter compound was treated with 1 cc. of concentrated hydrochloric acid in 250 cc. of acetone. Upon conventional isolation there was produced 11α-hydroxy-estrone.

Following exactly the same techniques there were treated the compounds set forth under A, thus being obtained as final products the corresponding compounds listed under B:

| A | B |
|---|---|
| Estradiol | 11α-hydroxy-estradiol. |
| 1-methyl-estrone cycloethyleneketal. | 1-methyl-11α-hydroxy-estrone. |
| 1-methyl-estradiol | 1-methyl-11α-hydroxy-estradiol. |
| 19-nor-Δ$^{1,3,5(10)}$-pregnatrien-3-ol-20-one. | 19-nor-Δ$^{1,3,5(10)}$-pregnatriene-3,11,20β-triol. |
| 19-nor-Δ$^{1,3,5(10)}$-pregnatriene-3,17α-diol 20-one. | 19-nor-Δ$^{1,3,5(10)}$-pregnatriene-3-11α,17α,20β-tetrol. |
| 1-methyl-19-nor-Δ$^{1,3,5(10)}$-pregnatrien-3-ol-20-one. | 1-methyl-19-nor-Δ$^{1,3,5(10)}$-pregnatriene-3,11α,20β-triol. |

Example I

A solution of 10 g. of 3-methyl-ether of 11α-hydroxy-estrone in 100 cc. of ethanol and 1 cc. of a 40% aqueous solution of sodium hydroxide, was mixed with 2 g. of ruthenium oxide and treated with hydrogen under a pressure of 120 atmospheres at 175° C. during 12 hours. The catalyst was filtered off and the filtrate neutralized with acetic acid and evaporated to dryness. The residue was chromatographed on a column containing 400 g. of alumina, thus being obtained 3β-methoxy-5α,10α-estrane-11α,17β-diol.

Example II

Example I was repeated except that the sodium hydroxide solution was substituted by concentrated hydrochloric acid, thus being obtained the same compound as in said example.

Example III

A solution of 2 g. of 11α-hydroxy-estrone in 100 cc. of ethanol was stirred with 400 mg. of platinum oxide catalyst under hydrogen atmosphere at 150° C. under a pressure of 100 atmospheres during 5 hours. The catalyst was filtered off and the filtrate neutralized with sodium bicarbonate solution. The resulting mixture was poured into water and the product extracted with ethyl acetate. The organic extract was dried over anhydrous sodium sulfate and evaporated to dryness. The residue was chromatographed on 80 g. of alumina, thus producing 5α,10α-estrane-3β,11α,17β-triol.

Example IV

The 3-methyl-ether of 11α-hydroxy-estrone was treated according to Example I, except that ruthenium oxide was substituted by 10% palladium on charcoal, thus giving 3β-methoxy-5α,10α-estrane-11α,17β-diol.

Example V

A solution of 10 g. of 11α-hydroxy-estradiol in 400 cc. of methanol was mixed with 2 g. of ruthenium oxide and treated with hydrogen under a pressure of 3 atmospheres at 125° C. during 24 hours. The catalyst was separated by filtration and the filtrate evaporated to dryness. The residue was chromatographed on 400 g. of alumina, to produce 5α,10α-estrane-3β,11α,17β-triol.

Example VI

The technique described in Example V was repeated, with the exception that ruthenium oxide was substituted by Raney nickel thus being obtained identical results to those of said example.

Example VII

A solution of 2 g. of 11α-hydroxy-estradiol in 150 cc. of methanol was mixed with 2 g. of ruthenium oxide and treated with hydrogen under atmospheric pressure at 90° C. during 30 hours. The catalyst was filtered off and the filtrate evaporated to dryness. The residue was chromatographed on a column of 80 g. of alumina, thus being obtained 5α,10α-estrane-3β,11α,17β-triol.

Example VIII

A solution of 1 g. of 3β-methoxy-5α,10α-estrane-11α,17β-diol in 10 cc. of acetone, was cooled to 0° C., then treated under a nitrogen atomsphere and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 3β-methoxy-5α,10α-estrane-11,17-dione.

Example IX

A solution of 6 g. of 3β-methoxy-5α,10α-estrane-11α,17β-diol in 120 cc. of pyridine was added to a mixture of 6 g. of chromic trioxide in 120 cc. of pyridine. The reaction mixture was kept at room temperature overnight. It was then diluted with ethyl acetate, filtered through Celite and the filtrate washed well with water, dried and evaporated to dryness. Crystallization from acetone-hexane afforded 3β-methoxy-5α,10α-estrane-11,17-dione.

Example X

A solution of 3 g. of 3β-methoxy-5α,10α-estrane-11,17-dione in 200 cc. of methanol was treated with 1 g. of sodium methoxide and the resulting solution was maintained at steam bath temperature for 1 hour, then it was poured into water and the product extracted with methylene chloride. The organic extract was washed with dilute hydrochloric acid then with water, dried over anhydrous sodium sulfate and evaporated to dryness. Recrystallization of the residue from ethyl-acetate-hexane produced 3β-methoxy-5α,9β,10α-estrane-11-17-dione.

Example XI

A mixture of 5 g. of 3β-methoxy-5α,10α-estrane-11,17-dione and 100 cc. of 1% solution of potassium hydroxide in methanol was kept at room temperature for 24 hours.

Water was added and the whole was extracted with methylene chloride, the organic extract washed with water to neutral, dried and evaporated to dryness. Crystallization of the residue from acetone-hexane produced 3β-methoxy-5α,9β,10α-estrane-11,17-dione.

Example XII

The foregoing example was repeated except that potassium hydroxide was substituted by sodium hydroxide, thus being obtained identical results to those of said example.

Example XIII

3β-methoxy-5α,10α-estrane-11,17-dione was treated in accordance with Example X, except that sodium ethoxide was used in lieu of sodium methoxide and ethanol instead of methanol, thus being produced 3β-methoxy-5α,9β,10α-estrane-11,17-dione.

Example XIV

The compounds listed under A were hydrogenated following the procedure described in Example III thus producing the respective products set forth under B.

| A | B |
|---|---|
| 3-methyl-ether of 11α-hydroxy-estradiol. | 3β-methoxy-5α,10α-estrane-11α,17β-diol. |
| 3-methyl-ether of 1-methyl-11α-hydroxy-estrone. | 3β-methoxy-1β-methyl-5α,10α-estrane-11α,17β-diol. |
| 3-methyl-ether of 1-methyl-11α-hydroxy-estradiol. | 3β-methoxy-1β-methyl-5α,10α-estrane-11α,17β-diol. |
| 3-methoxy-19-nor-Δ1,3,5(10)-pregnatriene-11α,20β-diol. | 3β-methoxy-19-nor-5α,10α-pregnane-11α,20β-diol. |
| 3-methoxy-19-nor-Δ1,3,5(10)-pregnatrien-11α,17α,20β-triol. | 3β-methoxy-19-nor-5α,10α-pregnane-11α,17α,20β-triol. |
| 3-methoxy-1-methyl-19-nor-Δ1,3,5(10)-pregnatriene-11α,20β-diol. | 3β-methoxy-1β-methyl-19-nor-5α,10α-pregnane-11α,20β-diol. |
| 3-methoxy-Δ2,5(10)-estradiene-11α,17β-diol. | 3β-methoxy-5α,10α-estrane-11α,17β-diol. |
| 3-methoxy-1α-methyl-Δ2,5(10)-estradiene-11α,17β-diol. | 3β-methoxy-1α-methyl-5α,10α-estrane-11α,17β-diol. |
| 3-methoxy-19-nor-Δ2,5(10)-pregnadiene-11α,20β-diol. | 3β-methoxy-19-nor-5α,10α-pregnane-11α,20β-diol. |
| 3-methoxy-19-nor-Δ2,5,(10)-pregnadiene-11α17α,20β-triol. | 3β-methoxy-19-nor-5α,10α-pregnane-11α,17α,20β-triol. |
| 3-methoxy-1α-methyl-19-nor-Δ2,5(10)-pregnadiene-11α,20β-diol. | 3β-methoxy-1α-methyl-19-nor-5α,10α-pregnane-11α,20β-diol. |
| Δ5(10)-estrene-11α,17β-diol-3-one. | 5α,10α-estrane-3β,11α,17β-triol. |
| 1α-methyl-Δ5(10)-estrene-11α,17β-diol-3-one. | 1α-methyl-5α,10α-estrane-3β,11α,17β-triol. |
| 19-nor-Δ5(10)-pregnene-11α,20β-diol-3-one. | 19-nor-5α,10α-pregnane-3β,11α,20β-triol. |
| 19-nor-Δ5(10)-pregnene-11α,17α,20β-triol-3-one. | 19-nor-5α,10α-pregnane-3β,11α,17α,20β-tetrol. |
| 1α-methyl-19-nor-Δ5(10)-pregnene-11α,20β-diol-3-one. | 1α-methyl-19-nor-5α,10α-pregnane-3β,11α,20β-triol. |
| 1-methyl-11α-hydroxy-estrone. | 1β-methyl-5α,10α-estrane-3β,11α,17β-triol. |
| 1-methyl-11α-hydroxy-estradiol. | 1β-methyl-5α,10α-estrane-3β,11α,17β-triol. |
| 19-nor-Δ1,3,5(10)-pregnatriene-3,11α,20β-triol. | 19-nor-5α,10α-pregnane-3β,11α,20β-triol. |
| 19-nor-Δ1,3,5(10)-pregnatriene-3,11α,17α,20β-tetrol. | 19-nor-5α,10α-pregnane-3β,11α,17α,20β-tetrol. |
| 1-methyl-19-nor-Δ1,3,5(10)-pregnatriene-3,11α,20β-triol. | 1β-methyl-19-nor-5α,10α-pregnane-3β,11α,20β-triol. |

Example XV

The compounds named under A were oxidized following the procedure described in Example XIII thus being respectively obtained the products listed under B.

| A | B |
|---|---|
| 3β-methoxy-1β-methyl-5α,10α-estrane-11α,17β-diol. | 3β-methoxy-1β-methyl-5α,10α-estrane-11,17-dione. |
| 3β-methoxy-19-nor-5α,10α-pregnane-11α,20β-diol. | 3β-methoxy-19-nor-5α,10α-pregnane-11,20-dione. |
| 3β-methoxy-19-nor-5α,10α-pregnane-11α,17α,20β-triol. | 3β-methoxy-19-nor-5α,10α-pregnan-17α-ol-11,20-dione. |
| 3β-methoxy-1β-methyl-19-nor-5α,10α-pregnane-11α,20β-diol. | 3β-methoxy-1β-methyl-19-nor-5α,10α-pregnane-11,20-dione. |
| 3β-methoxy-1α-methyl-5α,10α-estrane-11α,17β-diol. | 3β-methoxy-1α-methyl-5α,10α-estrane-11,17-dione. |
| 3β-methoxy-1α-methyl-19-nor-5α,10α-pregnane-11α,20α-diol. | 3β-methoxy-1α-methyl-19-nor-5α,10α-pregnane-11,20-dione. |
| 5α,10α-estrane-3β,11α,17β-triol. | 5α,10α-estrane-3,11,17-trione. |
| 1α-methyl-5α,10α-estrane-3β,11α,17β-triol. | 1α-methyl-5α,10α-estrane-3,11,17-trione. |
| 19-nor-5α,10α-pregnane-3β,11α,20β-triol. | 19-nor-5α,10α-pregnane-3,11,20-trione. |
| 19-nor-5α,10α-pregnane-3β,11α,17α,20β-tetrol. | 19-nor-5α,10α-pregnane-17α-ol-3,11,20-trione. |
| 1α-methyl-19-nor-5α,10α-pregnane-3β,11α,20β-triol. | 1α-methyl-19-nor-5α,10α-pregnane-3,11,20-trione. |
| 1β-methyl-5α,10α-estrane-3β,11α,17β-triol. | 1β-methyl-5α,10α-estrane-3,11,17-trione. |
| 1β-methyl-19-nor-5α,10α-pregnane-3β,11α,20β-triol. | 1β-methyl-19-nor-5α,10α-pregnane-3,11,20-trione. |

Example XVI

The final products obtained in accordance with Example XV, were treated following the procedure described in Example XI, thus giving respectively:

3β-methoxy-1β-methyl-5α,9β,10α-estrane-11,17-dione,
3β-methoxy-19-nor-5α,9β,10αpregnane-11,20-dione,
3β-methoxy-19-nor-5α,9β,10α-pregnan-17α-ol-11,20-dione,
3β-methoxy-1β-methyl-19-nor-5α,9β,10α-pregnane-11,20-dione,
3β-methoxy-1α-methyl-5α,9β,10α-estrane-11,17-dione,
3β-methoxy-1α-methyl-19-nor-5α,9β,10α-pregnane-11,20-dione,
5α,9β,10α-estrane-3,11,17-trione,
1α-methyl-5α,9β,10α-estrane-3,11,17-trione,
19-nor-5α,9β,10α-pregnane-3,11,20-trione,
19-nor-5α,9β,10α-pregnan-17α-ol-3,11,20-trione,
1α-methyl-19-nor-5α,9β,10α-pregnane-3,11,20-trione,
1β-methyl-5α,9β,10α-estrane-3,11,17-trione,
1β-methyl-19-nor-5α,9β,10α-pregnane-3,11,20-trione.

Example XVII

The Example XI was repeated except that methanol was substituted by ethanol, thus being obtained results identical to those of said example.

Example XVIII

Example XII was repeated except that ethanol was used instead of methanol, thus giving 3β-methoxy-5α,9β,10α-estrane-11,17-dione.

I claim:
1. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid with an alkaline medium.

2. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in a polar organic solvent, with a base selected from the group consisting of alkali metal hydroxide and alkali metal lower alkoxides.

3. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in a lower alkanol, with potassium hydroxide.

4. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in a lower alkanol, with sodium hydroxide.

5. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in a lower alkanol, with sodium methoxide.

6. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in a lower alkanol, with sodium ethoxide.

7. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in methanol, with potassium hydroxide.

8. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in methanol, with sodium hydroxide.

9. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in methanol, with sodium methoxide.

10. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in methanol, with sodium ethoxide.

11. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in ethanol, with potassium hydroxide.

12. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in ethanol, with sodium hydroxide.

13. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in ethanol, with sodium methoxide.

14. A process for the preparation of a compound selected from the group consisting of a 3β-hydroxy-5α,9β,10α-11-ketoestrane, a 3β-lower alkoxy-5α,9β,10α-11-ketoestrane, a 3β-hydroxy-5α,9β,10α-11-keto-19-norpregnane and a 3β-lower alkoxy-5α,9β,10α-11-keto-19-norpregnane which is otherwise unsubstituted in its A-ring and at positions 6, 8 and 9 except by hydrogen atoms which comprises treating the corresponding 9α-steroid, dissolved in ethanol, with sodium ethoxide.

15. A process for the preparation of 3β-methoxy-5α,9β,10α-estrane-11,17-dione which comprises treating 3β-methoxy-5α,9α,10α-estrane-11,17-dione, dissolved in methanol, with potassium hydroxide.

References Cited by the Examiner

UNITED STATES PATENTS

| | | | |
|---|---|---|---|
| 3,015,666 | 1/1962 | Farkas et al. | 260—397.5 |
| 3,130,212 | 4/1964 | Elks et al. | 260—397.45 |

OTHER REFERENCES

Burn et al.: "Jour. Chem. Soc.," 1957, page 4093 relied on.

Djerassi, "Optical Rotation Dispersion" (1960), McGraw-Hill, New York, page 58 relied on.

LEWIS GOTTS, *Primary Examiner.*